US011230768B2

(12) United States Patent
Cornen et al.

(10) Patent No.: US 11,230,768 B2
(45) Date of Patent: Jan. 25, 2022

(54) POLYMER-CONTAINING PRE-RINSE PRIOR TO A CONVERSION TREATMENT

(71) Applicant: Henkel AG & Co. KGaA, Duesseldorf (DE)

(72) Inventors: Sophie Cornen, Duesseldorf (DE); Kristof Wapner, Duesseldorf (DE); Ralf Posner, Dormagen (DE); Natascha Henze, Leverkusen (DE); Kirsten Agnes Lill, Cologne (DE); Michiel Gerard Maas, Leverkusen (DE)

(73) Assignee: Henkel AG & Co. KGaA, Duesseldorf (DE)

( * ) Notice: Subject to any disclaimer, the term of this patent is extended or adjusted under 35 U.S.C. 154(b) by 408 days.

(21) Appl. No.: 15/783,171

(22) Filed: Oct. 13, 2017

(65) Prior Publication Data
US 2018/0051377 A1 Feb. 22, 2018

Related U.S. Application Data

(63) Continuation of application No. PCT/EP2016/057220, filed on Apr. 1, 2016.

(30) Foreign Application Priority Data

Apr. 15, 2015 (DE) .......................... 102015206812.9

(51) Int. Cl.
| | | |
|---|---|---|
| *C23C 22/34* | (2006.01) | |
| *C23C 22/78* | (2006.01) | |
| *C11D 11/00* | (2006.01) | |
| *C09D 133/06* | (2006.01) | |
| *C09D 5/08* | (2006.01) | |
| *C09D 139/06* | (2006.01) | |
| *C09D 5/12* | (2006.01) | |
| *C23F 11/173* | (2006.01) | |
| *C08L 39/04* | (2006.01) | |
| *C23C 22/28* | (2006.01) | |
| *C23C 22/44* | (2006.01) | |
| *C08L 33/10* | (2006.01) | |

(52) U.S. Cl.
CPC .............. *C23C 22/78* (2013.01); *C08L 39/04* (2013.01); *C09D 5/08* (2013.01); *C09D 5/12* (2013.01); *C09D 133/06* (2013.01); *C09D 139/06* (2013.01); *C11D 11/0029* (2013.01); *C23C 22/28* (2013.01); *C23C 22/34* (2013.01); *C23F 11/173* (2013.01); *C08L 33/10* (2013.01)

(58) Field of Classification Search
CPC ........ C23C 22/34; C23C 22/361; C23C 22/44
USPC ..................................................... 148/247
See application file for complete search history.

(56) References Cited

U.S. PATENT DOCUMENTS

| | | | |
|---|---|---|---|
| 3,365,313 | A | 1/1968 | Roberts, Jr. et al. |
| 5,685,922 | A | 11/1997 | Endou et al. |
| 2005/0012077 | A1 | 1/2005 | Hall et al. |
| 2007/0017602 | A1 | 1/2007 | Koch et al. |
| 2010/0222248 | A1 | 9/2010 | Komp et al. |
| 2012/0282404 | A1 | 11/2012 | Rosenkranz et al. |
| 2013/0273274 | A1 | 10/2013 | Mueller et al. |

FOREIGN PATENT DOCUMENTS

| | | |
|---|---|---|
| CN | 1795292 A | 6/2006 |
| CN | 101098986 A | 1/2008 |
| CN | 101289359 A | 10/2008 |
| CN | 101473068 A | 7/2009 |
| CN | 103643231 A | 3/2014 |
| DE | 4441710 A1 | 5/1996 |
| DE | 10005113 A1 | 8/2001 |
| DE | 10310972 A1 | 9/2004 |
| DE | 10353149 | 6/2005 |
| DE | 10358309 A1 | 7/2005 |
| EP | 0144760 A2 | 6/1985 |
| EP | 0227179 B1 | 7/1990 |
| EP | 0946788 B1 | 7/2001 |
| EP | 1266047 B1 | 12/2002 |
| EP | 1455002 A1 | 9/2004 |
| EP | 1402083 B1 | 4/2005 |
| EP | 2253741 A2 | 11/2010 |
| EP | 2094880 B1 | 9/2012 |
| JP | 2003253464 A | 9/2003 |
| JP | 2009280887 A | 12/2009 |
| JP | 2009280888 A | 12/2009 |
| JP | 2009280889 A | 12/2009 |
| JP | 2014522915 A | 9/2014 |
| WO | 0231065 A2 | 4/2002 |
| WO | 2006061230 A1 | 6/2006 |
| WO | 2008135478 A2 | 11/2008 |
| WO | 2011012443 A1 | 2/2011 |

(Continued)

OTHER PUBLICATIONS

International Search Report, PCT/EP2016/057220, dated Jul. 22, 2016.

(Continued)

Primary Examiner — Lois L Zheng

(74) Attorney, Agent, or Firm — Mary K. Cameron

(57) ABSTRACT

A multi-step method for anti-corrosion pretreatment of components made from metallic materials, in which a wet chemical treatment with an aqueous composition (A) containing a dissolved and/or dispersed polymer P, which is substituted with heterocycles containing at least one quaternary nitrogen heteroatom, is followed by a conversion treatment based on water-soluble compounds of the elements Zr, Ti, and/or Si before further anti-corrosion coatings are optionally applied.

20 Claims, No Drawings

(56) References Cited

FOREIGN PATENT DOCUMENTS

| WO | 2011098322 A1 | 8/2011 |
| WO | 2012045712 A1 | 4/2012 |
| WO | 2012045725 A1 | 4/2012 |
| WO | 2014151617 A1 | 9/2014 |

OTHER PUBLICATIONS

International Search Report for PCT/EP2016/061209 dated Jul. 27, 2016.
German Patent Office Recherchebericht dated Feb. 17, 2016 from instant priority German application No. 102015206812.9.
Geman Patent Office Rechercheberichi dated Mar. 10, 2016 from related priority German application No. 102015209910.5.

POLYMER-CONTAINING PRE-RINSE PRIOR TO A CONVERSION TREATMENT

The present invention relates to a multi-step method for the anti-corrosion pretreatment of components made from metallic materials, in which a wet chemical treatment with an aqueous composition (A) containing a dissolved and/or dispersed polymer P that is substituted with heterocycles containing at least one quaternary nitrogen heteroatom is followed by a conversion treatment based on water-soluble compounds of the elements Zr, Ti, and/or Si before further anti-corrosion coatings are optionally applied.

The conversion treatment of metallic surfaces for providing an anti-corrosion coating based on aqueous compositions containing water-soluble compounds of the elements Zr, Ti, and/or Si is a technical field that has been described extensively in the patent literature. For improving the property profile of such conversion treatments with regard to corrosion protection and imparting sufficient coating adhesion, numerous variants of such a metal pretreatment are known which either focus on the composition of the agents that bring about the conversion, or which use further wet chemical treatment steps in the direct context of the conversion treatment.

EP 1 455 002 A1 describes, for example, that for conversion treatment by means of previously described compositions that additionally contain fluoride ions as complexing agent and the pickling agent for the metal surfaces, it is advantageous when, for reducing the fluoride content in the conversion layer, the actual wet chemical treatment is followed by an aqueous rinse containing basically reacting compounds, or a drying step. Alternatively, for reducing the fluoride content in the conversion layer, certain cations selected from calcium, magnesium, zinc, or copper, or silicon-containing compounds are added to the composition which brings about the conversion of the surface.

With regard to further adaptations of the process sequence when using agents containing fluoride ions and water-soluble compounds of the elements Zr and/or Ti for the conversion treatment, WO 2011/012443 A1 teaches a subsequent aqueous rinse containing organic compounds having aromatic heterocycles containing at least one nitrogen heteroatom.

Likewise, DE 100 05 113 A1 discloses a method in which the conversion treatment of a metal surface is followed by a wet chemical treatment with an aqueous composition containing homopolymers and/or copolymers of vinylpyrrolidone, preferably using copolymers of vinylpyrrolidone having additional caprolactam groups. In another aspect of the cited unexamined patent application, the application of such homopolymers or copolymers to the bright metal surface for subsequent lacquering is described.

A related teaching is also disclosed in DE 103 58 309 A1, which proposes the use of phenol-aldehyde resins which, in addition to the phenolic component, contain an aromatic hydroxycarboxylic acid and imidazole instead of the above-mentioned homopolymers and copolymers for the anti-corrosion treatment of bright metal surfaces or metal surfaces provided with a conversion layer.

In contrast to this prior art, the object is to further harmonize the anti-corrosion properties of conversion layers on various metal substrates that are obtainable by pretreatment with compositions of water-soluble compounds of the elements Zr, Ti, and/or Si, and to improve same, in particular on steel surfaces. The aim in particular is for the average infiltration values in the corrosive delamination after building up a coating layer to be improved or at least stabilized with regard to their variance, i.e., to be reliably achievable from a process engineering standpoint. With regard to the use on various metal substrates, in particular an optimal corrosion protection effect of such composite structures, which in addition to surfaces of the materials zinc, iron, steel, and/or galvanized steel also have surfaces of the material aluminum, by means of an appropriate wet chemical pretreatment is desirable.

This object is achieved by a multi-step method for the anti-corrosion pretreatment of components made at least partially from metallic materials, in which initially i) at least a portion of the surfaces of the component that are formed by the metallic materials are brought into contact with an aqueous composition (A) containing a dissolved and/or dispersed organic polymer P at least partially made up of repeating units $R_N$ which as substituents have a heterocycle containing at least one quaternary nitrogen heteroatom, and subsequently ii) at least the same portion of the surfaces of the component that are formed by the metallic materials, with or without a rinsing and/or drying step in between, is brought into contact with an acidic aqueous composition (B) containing one or more water-soluble compounds of the elements Zr, Ti, and/or Si.

The components treated according to the present invention may be three-dimensional structures having any desired shape and configuration, which originate from a fabrication process, in particular also semi-finished products such as strips, sheets, rods, tubes, etc., as well as composite structures assembled from the aforementioned semi-finished products.

According to the invention, in the first step i) of the method according to the invention a treatment with the aqueous composition (A) containing the polymer P is carried out. This treatment brings about conditioning of the surfaces of the component, formed from the metallic materials, in such a way that in the course of the conversion treatment an excellent coating adhesion base is provided in the subsequent step ii). Improved suppression of corrosive infiltration at defects in the lacquer coating is achieved in particular on steel surfaces. In addition, on steel surfaces, a very low variance in the corrosion protection values may be empirically established for treatment conditions that are otherwise the same. Overall, harmonization and greater reliability of the corrosion protection results over a fairly large number of components to be treated are thus achieved with the method according to the invention.

The success according to the invention is surprisingly realized largely independently of carrying out a rinsing and/or drying step immediately following the conditioning in step i). Differences in the performance of the method that result from a rinsing step in between may generally be compensated for by a moderate increase in the concentration of polymer P dissolved and/or dispersed in the aqueous composition (A). In any case, the general suitability of the method for achieving the underlying object of the invention is not affected by carrying out a rinsing and/or drying step between method steps i) and ii).

According to the invention, a rinsing step is always used for removing water-soluble residues, nonadherent chemical compounds, and loose solid particles from the component to be treated, which together with the wet film adhering to the component are dragged out of a preceding wet chemical treatment step by means of a water-based liquid medium. The water-based liquid medium contains no chemical components that result in significant surface coverage of the components, made from metallic materials, with subgroup elements, metalloid elements, or polymeric organic compounds. In any case, such significant surface coverage is present when the liquid medium of the rinse depletes at least 10 milligrams per square meter of the rinsed surfaces, preferably at least 1 milligram per square meter of the rinsed surfaces, of these components, based on the particular element or the particular polymeric organic compound, without taking into account gains from carry-over and losses from drag-out from wet films adhering to the component.

According to the invention, a drying step is any method step which, by providing and using technical means, is intended to dry the aqueous liquid film adhering to the surface of the component, in particular by supplying thermal energy or applying an air stream.

The polymer P contained in the aqueous composition (A) in step i) is present dissolved and/or dispersed in water. Whenever general or specific reference is made herein to the presence of a polymer, this essentially always encompasses a plurality of such polymeric individual compounds. In addition, in the present case, organic polymers according to the invention that have the particular physical property and/or chemical constitution of importance have a weight average molar mass $M_w$ of at least 5000 g/mol, preferably at least 10,000 g/mol, particularly preferably at least 20,000 g/mol, but preferably not more than 500,000 g/mol, particularly preferably not more than 200,000 g/mol, very particularly preferably not more than 100,000 g/mol. A dissolved or dispersed organic polymer within the meaning of the invention in the aqueous phase has an average particle diameter of less than 1 μm. The average particle diameter may be determined directly in composition (A) at 20° C. according to ISO 13320:2009 via laser light diffraction, based on cumulative particle size distributions, as the so-called D50 value.

In this regard, it should be noted that according to the present invention, compounds that do not represent organic polymers are regarded as water-soluble when their solubility in deionized water ($\kappa < 1\ \mu Scm^{-1}$) is at least 1 g/L at 20° C.

Furthermore, the repeating units $R_N$ of the polymer P contained in composition (A) are configured in such a way that they have a heterocycle containing at least one quaternary nitrogen heteroatom as a structural element. A quaternary nitrogen atom has only covalent bonds with carbon atoms, and therefore has a permanent positive charge. According to the invention, repeating units that represent repeating structural units of a polymeric organic compound may be present in the particular polymeric compound either in a cumulative or a statistical distribution. A structural unit is a repeating unit of a polymeric compound when it is contained therein at least ten times.

According to the invention, the heterocyclic structural element containing the quaternary nitrogen atom may bridge a substituent of the structural element of the repeating unit $R_N$ that links the repeating units, and thus, a part of the side chain of the polymer P or the linkage sites of the repeating unit $R_N$, and thus itself may be part of the main chain of the polymer P. The heterocyclic structural element containing the quaternary nitrogen atom preferably corresponds to the following structural formula (I):

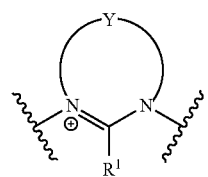

(I)

where the functional group $R^1$ is selected from hydrogen; branched or unbranched aliphatics having no more than 6 carbon atoms; and a functional group represented by $-(CR^4R^4)_x-[Z(R^4)_{(p-1)}-(CR^4R^4)_y]_n-Z(R^4)_p$, where Z is in each case selected from oxygen or nitrogen, and p, for the case that Z is nitrogen, has the value 2 and otherwise is 1, and x and y are each natural numbers ranging from 1 to 4, and n is likewise a natural number ranging from 0 to 4, and $R^4$ is selected from hydrogen; branched or unbranched aliphatics having no more than 6 carbon atoms;

where Y is a ring-constituting divalent functional group having no more than 5 bridge atoms, and no more than one hetero bridge atom that is different from carbon atoms may be selected from an oxygen, nitrogen, or sulfur bridge atom, and the carbon atoms in turn are present substituted independently of one another with functional groups $R^1$ or those functional groups via which annulation of aromatic homocyclen having no more than 6 carbon atoms is achieved.

In one preferred embodiment, the repeating units $R_N$ of the polymer P are configured in such a way that the heterocyclic structural element containing the quaternary nitrogen atom is present in the polymer P on the one hand in the side chain, and on the other hand has certain chemical-structural properties that are manifested in the following structural formula (II) of the repeating unit $R_N$:

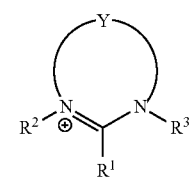

(II)

where the functional group $R^1$ is selected from hydrogen or branched or unbranched aliphatics having no more than 6 carbon atoms, or the functional group $-(CR^4R^4)_x-[Z(R^4)_{(p-1)}-(CR^4R^4)_y]_n-Z(R^4)_p$, where Z is in each case selected from oxygen or nitrogen, and p, for the case that Z is nitrogen, has the value 2 and otherwise is 1, and x and y are each natural numbers from 1 to 4, and n is likewise a natural number from 0 to 4, and $R^4$ is selected from hydrogen or branched or unbranched aliphatics having no more than 6 carbon atoms;

where the functional groups $R^2$ and $R^3$ are selected from functional groups $R^1$ or the remaining fragment of the repeating unit $R_N$ via which the repeating units $R_N$ are covalently bonded to one another or to other repeating units $R_X$, with the condition that either $R^2$ or $R^3$ represents that fragment of the repeating unit $R_N$, and the remaining fragment of the repeating unit $R_N$ is preferably selected from 1-ethanyl-2-ylidene, 1-propanyliden-2-yl, or 1-propanyl-2-ylidene, these preferred remaining fragments of the repeating units $R_N$ each being covalently bonded via carbon atoms that are directly covalently bonded to one another or to different or identical repeating units;

where Y is a ring-constituting divalent functional group having no more than 5 bridge atoms, and no more than one hetero bridge atom that is different from carbon atoms may be selected from an oxygen, nitrogen, or sulfur bridge atom, and the carbon atoms in turn are present substituted independently of one another with functional groups $R^1$ or those functional groups via which annulation of aromatic homocyclen having no more than 6 carbon atoms is achieved.

It has basically been shown to be advantageous that the repeating unit $R_N$ of the polymer P bears substituents having the heterocyclic basic structure of imidazole, imidazoline, pyrimidine, purine, and/or quinazoline. In this regard, it is accordingly preferred that the repeating unit $R_N$ of the polymer P bears substituents according to general structural formula (I) whose ring-constituting divalent functional group Y is selected from ethylene, ethenediyl, 1,3-propanediyl, 1,3-propenediyl, 1,4-butanediyl, 1,4-butenediyl, 1,4-butadiendiyl, —CH═N—, —CH$_2$—NH—, (N,N-dimethylene)amine, (N-methylene-N-methylylidene)amine, particularly preferably from ethenediyl, 1,4-butadiendiyl, —C═N, or (N-methylene-N-methylylidene)amine, very particularly preferably from ethenediyl or —C═N—, and extremely preferably from ethenediyl, wherein hydrogen that is covalently bonded to carbon atoms may in each case be substituted by the remaining representatives of the functional group $R^1$ according to general structural formula (I).

Repeating units $R_N$ of the polymer P whose repeating unit $R_N$ is selected from 1-methyl-3-vinylimidazolium, 1-ethyl-3-vinylimidazolium, 1-isopropyl-3-vinylimidazolium, 1-propyl-3-vinylimidazolium, 1-(n-butyl)-3-vinylimidazolium, 1-(isobutyl)-3-vinylimidazolium, 1-methoxy-3-vinylimidazolium, 1-ethoxy-3-vinylimidazolium, 1-propoxy-3-vinylimidazolium, particularly preferably 1-methyl-3-vinylimidazolium, have particularly advantageously been proven as effective in conditioning the surfaces of components, formed from metallic materials, prior to a conversion treatment.

The polymers P in composition (A) preferably additionally have at least one further repeating unit $R_X$ that is selected from vinylpyrrolidone, vinylcaprolactam, vinyl acetate, vinylimidazole, (meth)acrylic acid amide, (meth)acrylic acid, (meth)acrylic acid esters, and/or styrene, preferably selected from vinylpyrrolidone, vinylimidazole, and/or (meth)acrylic acid amide, particularly preferably selected from vinylpyrrolidone.

For sufficiently effective conditioning in step i) prior to the conversion treatment, the proportion of repeating units $R_N$ in the polymer P should not be below a certain level. Accordingly, it is preferred according to the invention when the weight fraction of the repeating units $R_N$ is at least 40%, preferably at least 60%, particularly preferably at least 80%, based on the overall fraction of the polymer P.

Alternatively or simultaneously, it should be ensured that the cationic charge density of the polymer P is preferably at least 2 meq, particularly preferably at least 4 meq, very particularly preferably at least 6 meq, per gram of the polymer P.

The type of counterion with respect to the quaternary nitrogen atom of the polymer P likewise surprisingly has an influence on the conditioning of the metal surfaces of the component. Such counterions with respect to the quaternary nitrogen atoms in the heterocycle of the substituent of the repeating units $R_N$ of the polymer P that are selected from carbonate, sulfate, nitrate, monoalkyl sulfates having no more than 4 carbon atoms, hydroxide, chloride, and/or fluoride, preferably selected from nitrate, hydroxide, chloride, and/or fluoride, have been found to be advantageous and therefore preferred according to the invention.

In addition, it has been found that it is generally advantageous according to the invention when the proportion of the polymer P is at least 0.05 g/kg, preferably at least 0.2 g/kg, particularly preferably at least 0.4 g/kg, but preferably not more than 2 g/kg, in each case based on composition (A). Above 2 g/kg, even when the conditioning in step i) is followed by a rinsing step, no further improvement in the corrosion protection after coating buildup is observed, so that in the method according to the invention it would not be economical to use a quantity of the polymer P that exceeds this level. In addition, for certain materials such as aluminum, it has been observed that higher contents may adversely affect the coating adhesion, so that the harmonization of the corrosion protection on numerous metallic materials, sought according to the invention, is endangered due to higher contents of the polymer P in composition (A).

The pH of composition (A) in step i) may be essentially freely selected, and is typically in the range of 2 to 14, preferably above 3.0, particularly preferably above 4.0, very particularly preferably above 5.0, but preferably below 12.0, particularly preferably below 10.0, and very particularly preferably below 8.0.

However, for certain variants of the method according to the invention, there is a preferred window for the pH. For components whose surfaces formed by metallic materials are contaminated by drawing greases, corrosion protection oils, or corrosion products, composition (A) for the conditioning in step i) may be formulated in such a way that cleaning and thus associated pickling of the metal surfaces is brought about. In such a method according to the invention, the pH is preferably either in the range of 2 to 4.5 or in the range of 9 to 14. However, providing an alkaline composition (A) is preferred in order to combine conditioning of the surfaces of the metallic materials with cleaning.

If cleaning is not necessary in step i) of the method according to the invention, a pH in the range of 5.0 to 8.0 is preferred, in which the metallic materials zinc and steel have low corrosion rates, and the addition of strongly alkalinely or strongly acidically reacting additives may be dispensed with.

According to the invention, composition (A) may accordingly contain further components. In addition to the pH-regulating substances, these may also be surface-active substances whose use in a composition (A) having cleaning action is preferred. Furthermore, for the treatment of components it may be advantageous for the surfaces of the materials to contain zinc and/or galvanized steel, and for composition (A) to additionally contain a quantity of iron ions which, upon contact with the zinc surfaces, causes a thin coating layer of iron to form there, and in addition to the harmonization of the corrosion protection, is thus accessible in the method according to the invention, in particular for surfaces of the material iron. According to the teaching of WO 2008/135478 A1, in an acidic environment such steeling may preferably take place in the presence of a reducing agent, or according to the teaching of WO 2011/098322 A1, in an alkaline environment may preferably take place in the presence of complexing agents and phosphate ions.

However, it is preferred when composition (A) in step i) of the method according to the invention has an overall content of less than 500 ppm, particularly preferably less than 100 ppm, very particularly preferably less than 50 ppm, of dissolved and/or dispersed organic polymers which do not represent polymer P. This ensures that the interaction of such polymers with the surfaces of the metallic materials of the component does not compete with that of the polymers P, thus counteracting the desired effect of the conditioning.

In addition, to prevent the formation of a conversion layer on the surfaces of the metallic materials of the component, in step i) composition (A) in each case preferably contain less than 0.005 g/kg, in each case particularly preferably less than 0.001 g/kg, of water-soluble compounds of the elements Zr, Ti, and/or Si, based on the particular element, preferably less than 1 g/kg of water-soluble compounds of the elements Zn, Mn, and Ca, based on the particular element, and/or preferably less than 0.05 g/kg, particularly preferably less than 0.01 g/kg, of free fluoride, determined with a fluoride-sensitive electrode at 20° C.

In one preferred method according to the invention, composition (A) therefore contains no components in such a quantity that, during the period provided for the conditioning in step i), allows a conversion layer to form on a surface of the component that is formed from a metallic material. A conversion layer within the meaning of the present invention is present when a cover layer containing phosphates, oxides, and/or hydroxides of elements of the titanium group, vanadium group, and/or chromium group, or phosphates of the elements calcium, iron, and/or zinc is wet chemically created on the particular surface of the metallic material in a coating layer of at least 5 mg/m$^2$, based on the particular subgroup element, or of at least 50 mg/m$^2$, based on the element phosphorus.

In method step ii), the acidic aqueous composition (B) should contain a quantity of active components that is sufficient for forming a conversion layer. In this regard, it is advantageous when composition (B) in step ii) contains at least 0.01 g/kg, preferably at least 0.02 g/kg, of a water-soluble compound of the elements Zr, Ti, or Si, based on the element Zr, Ti, or Si, respectively.

For economic reasons, it is also advantageous when the overall content of these compounds, based on the elements Zr, Ti, and Si, is preferably no greater than 0.5 g/kg, since higher levels usually do not further improve the anti-corrosion properties of the conversion layer, but, rather, hamper control of the coating layer with regard to these elements due to the higher deposition kinetics.

Suitable representatives of the water-soluble compounds of the elements Zr, Ti, or Si are compounds which in aqueous solution dissociate into anions of fluoro complexes. Examples of such preferred compounds are $H_2ZrF_6$, $K_2ZrF_6$, $Na_2ZrF_6$, and $(NH_4)_2ZrF_6$ and the analogous titanium and silicon compounds. In addition, fluorine-free compounds of the elements Zr, Ti, or Si, in particular of the elements Zr or Ti, for example $(NH_4)_2Zr(OH)_2(CO_3)_2$ or $TiO(SO_4)$, or silanes with at least one covalent Si—O bond, may be used according to the invention as water-soluble compounds.

Although with the prior conditioning in step i), even small coating weights in the conversion layer formation are sufficient for good corrosion protection, it is generally advantageous when composition (B) contains a source of fluoride ions, preferably selected from complex or simple fluorides. Simple fluorides are understood by those skilled in the art to mean hydrofluoric acid and the salts thereof, such as alkali fluorides, ammonium fluoride, or ammonium bifluoride, while according to the invention, complex fluorides represent coordination compounds in which fluorides are present in coordinated form as ligands of one or more central atoms. Accordingly, preferred representatives of the complex fluorides are the above-mentioned fluorine-containing complex compounds of the elements Zr, Ti, or Si.

The proportion of components that represent a source of fluoride ions is preferably large enough in composition (B) that a quantity of free fluoride of at least 0.05 g/kg, but preferably not more than 0.4 g/kg, measured with a fluoride-sensitive electrode at 20° C., results.

In combination with the conditioning in step i), the best results with regard to corrosion protection are achieved when composition (B) in step ii) contains copper ions. In one particularly preferred embodiment of the method according to the invention, composition (B) therefore additionally contains water-soluble compounds that represent a source of copper ions, preferably in the form of water-soluble salts, for example copper sulfate, copper nitrate, and copper acetate.

The copper content of water-soluble compounds in composition (B) is preferably at least 0.001 g/kg, particularly preferably at least 0.005 g/kg. However, the content of copper ions is preferably not above 0.1 g/kg, particularly preferably not above 0.05 g/kg, since otherwise the deposition of elemental copper begins to dominate over the conversion layer formation.

The pH of the acidic aqueous composition (B) is preferably in the range of 2.5 to 5.0, particularly preferably in the range of 3.5 to 4.5.

Furthermore, it is preferred when composition (B) contains nitrate ions as an accelerator of the conversion layer formation, wherein the proportion of nitrate ions is preferably at least 0.5 g/kg, but for economic reasons preferably does not exceed 4 g/kg.

The components that are treated in the method according to the invention are made at least partially of metallic materials. Preferred metallic materials which clearly improve the properties of the conversion layer as a coating adhesion base are iron and alloys of iron, in particular steel; zinc, galvanized steel, and aluminum as well as the alloys of the materials zinc and aluminum are also provided with a high-quality conversion layer in the method according to the invention. In this regard, materials that contain at least 50 wt. % of the elements of the material in question as an alloy component are suitable as alloys of these materials. On surfaces of iron and its alloys there is a significant improvement of the corrosion protection in the corrosive infiltration of lacquer defects, which is even largely independent of whether a rinsing and/or drying step immediately follows the conditioning in step i).

In one preferred embodiment of the method according to the invention, the component therefore has surfaces of the materials iron and/or steel at least in part, with preferably at least 50%, particularly preferably at least 80%, of the surface of the component, which are surfaces of metallic materials, being formed from surfaces of the materials iron and/or steel.

When the components contain surfaces of zinc and galvanized steel in part, it is observed that in the case of a rinsing step immediately following the conditioning, a higher variance occurs with regard to the corrosion protection on these surfaces. However, this higher variance may be leveled out by selecting a comparatively higher concentration of polymer P in composition (A) in the conditioning, i.e., in method step i).

If the component also contains surfaces of the material aluminum, for the conditioning a higher concentration of polymers P in composition (A) may adversely affect the corrosion values on the aluminum surfaces.

In principle, however, composite structures and in particular components which in addition to surfaces of the materials iron and/or steel also have surfaces of the materials zinc and/or galvanized steel as well as aluminum may be treated in the method according to the invention, with the result that greatly improved corrosion protection and a lower variance in the corrosion protection values on the surfaces of the materials iron and/or steel are achieved, while the conditioning on the surfaces of the remaining metallic materials does not have a negative effect on the corrosion protection effect of the conversion layer based on the elements Zr, Ti, and/or Si. This property of the method according to the invention on the above-mentioned metallic surfaces, of ensuring the formation of homogeneous, thin anti-corrosion conversion layers, is of great importance for the surface treatment of automotive bodies, since these routinely have types of material combinations that are joined together by joining techniques such as spot welding, seaming, or integral adhesive bonding.

In one preferred embodiment, in addition to surfaces of the materials iron and/or steel and surfaces of the materials zinc and/or galvanized steel, the component therefore preferably also contains surfaces of the material aluminum, preferably with omission of a rinsing step, and particularly preferably omission of a rinsing step and drying step, after the conditioning in step i) and prior to the conversion treatment in step ii), and in addition the proportion of dissolved and/or dispersed polymer P in aqueous composition (A) is preferably not greater than 1.2 g/kg, particularly preferably not greater than 0.8 g/kg.

Furthermore, for the case that the component has surfaces of the materials zinc and/or galvanized steel, it is generally preferred that these surfaces are provided with a thin, amorphous layer containing iron, so that the surfaces of these materials are provided with conditioning in step i) of the method according to the invention that is just as effective as that typically determined for the surfaces of the materials iron and/or steel. Such particularly effective steeling of the surfaces of zinc and/or galvanized steel is described in unexamined patent applications WO 2011098322 A1 and WO 2008135478 A1, in each case as a wet chemical method which in an equivalent manner may be applied immediately prior to carrying out method step i) according to the invention. In this regard, for the method according to the invention in which the component is made at least in part from the materials zinc and/or galvanized steel, it is preferred that the surfaces of the component made from these materials have an iron coverage of at least 20 mg/m$^2$, but preferably not more than 150 mg/m$^2$.

EXEMPLARY EMBODIMENTS

As described below, sheets of steel (CRS), galvanized steel (HDG), and aluminum were each independently subjected to a multi-step method for anti-corrosion pretreatment. The suitability of metal sheets, pretreated in this way and provided with a coating layer, for providing a good coating adhesion base was examined in respective material-specific corrosion tests.

The general method for the pretreatment and coating is made up of the following successive mandatory and optional individual steps A)-E):

A) Alkaline cleaning and degreasing:
   The sheet is immersed, with stirring, in an alkaline cleaner composed of 4% by weight Ridoline® 2011 (Henkel) and 0.5% by weight Ridosol® 1561 (Henkel) at 60° C. for 3 minutes for aluminum substrates, and at 60° C. for 5 minutes for steels and galvanized steels;
B) Rinsing with process water and then with deionized water ($\kappa$<1 µScm$^{-1}$) at 20° C. in each case;
C) Conditioning by immersion of the sheet, with stirring, at 35° C. for 1 minute in a composition containing a predefined quantity of an organic polymer in deionized water ($\kappa$<1 µScm$^{-1}$) without further additional of pH-modifying substances;
D) Optionally rinsing with deionized water at 20° C. ($\kappa$<1 µScm$^{-1}$);
E) Conversion treatment by immersing the sheet, with stirring, at 35° C. for 3 minutes in an aqueous composition having a pH of 4.0, containing
   0.34 g/kg of H$_2$ZrF$_6$
   0.10 g/kg of CuSO$_4$
   3.0 g/kg of nitrate ions from sodium nitrate and a quantity of (NH$_4$)HF$_2$ sufficient for setting a free fluoride content of 23 mg/kg, measured with a fluoride-sensitive electrode at 20° C., using a potentiometric measurement chain (WTW, inoLab®, pH/ion level 3) containing a fluoride-sensitive glass electrode (WTW, F501) and a reference electrode (WTW, R503), and a three-point calibration is performed, using calibration solutions having a content of 10 mg/kg, 100 mg/kg, and 1000 mg/kg of free fluoride, prepared from the Merck Titrisol® fluoride standard without addition of buffer.

After the conversion treatment in method step E), all sheets were initially rinsed with deionized water ($\kappa$<1 µScm$^{-1}$) at 20° C., and subsequently coated with a cathodic dip coating and dried at 180° C. (dry layer thickness: 18-20 µm; CathoGuard® 800 from BASF Coatings).

The various polymer-containing compositions used in the conditioning in step C) are shown in Table 1 below.

TABLE 1

Compositions used in the conditioning; pH approximately 5.0-5.6

| | Polymer P | | |
|---|---|---|---|
| | Quantity in mg/kg | Monomer | Molar ratio (QVI:VP) |
| C1 | 2000 | 1-Methyl-3-vinylimidazolium (QVI); vinylpyrrolidone (VP) | 95:5 |
| C2 | 1000 | 1-Methyl-3-vinylimidazolium (QVI); vinylpyrrolidone (VP) | 95:5 |
| C3 | 500 | 1-Methyl-3-vinylimidazolium (QVI); vinylpyrrolidone (VP) | 95:5 |
| C4 | 100 | 1-Methyl-3-vinylimidazolium (QVI); vinylpyrrolidone (VP) | 95:5 |
| C5 | 2000 | 1-Methyl-3-vinylimidazolium (QVI); vinylpyrrolidone (VP) | 30:70 |
| C6 | 1000 | CELQUAT ® SC-240C (AkzoNobel N.V.) | — |

The corrosion results and the particular associated method sequence are shown in Table 2. It is clear that, with regard to infiltration after aging in the alternating climate test and the stone chipping test, much better results were obtained on steel sheets in comparison to a strict conversion treatment (No. 9) when conditioning of the type of the present invention was carried out (Nos. 1-8). It was possible to obtain excellent corrosion protection results on steel and aluminum (compare No. 1 and No. 5) in particular for polymer-containing compositions in the conditioning C) in which the relative proportion of an heterocyclic structural units containing quaternary nitrogen atoms in the polymer was relatively high.

Conversely, Example 9 demonstrates that not every polymer that bears substituents containing quaternary nitrogen atoms is able to provide successful conditioning of the metal surface for the subsequent conversion treatment. The polymer in the conditioning for Example 9 is a modified cellulose in which tetraalkylammonium structural units are bound to the cellulose basic structure via polyether bridges.

The dependency of the conditioning on concentration shows a trend that in methods in which the conditioning is immediately followed by a rinse with deionized water, higher proportions of polymers are advantageous for maintaining good corrosion values on galvanized steel (compare No. 8 and No. 3, and No. 7 and No. 2). It may be concluded that for the steel substrates, a subsequent rinse with the same conditioning for corrosion protection is slightly advantageous (compare No. 8 and No. 3, and No. 7 and No. 2). The optimum for the substrate aluminum is independent of whether rinsing is carried out after the conditioning, preferably with average contents of the copolymers based on imidazolium (see No. 3 and No. 7).

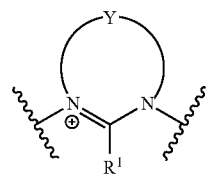

(I)

where $R^1$ is selected from hydrogen, branched or unbranched aliphatic functional groups having no more than 6 carbon atoms, and a functional group —$(CR^4R^4)_x$—$[Z(R^4)_{(p-1)}$—$(CR^4R^4)_y]_n$—$Z(R^4)_p$, where Z is in each case selected from oxygen or nitrogen;

p, where Z is nitrogen, has the value 2 and otherwise is 1;

TABLE 2

Corrosion results on the correspondingly pretreated and dip-coated sheets

| | | CRS | | | HDG | | | Al[4] | |
|---|---|---|---|---|---|---|---|---|---|
| No. | Method sequence | Corrosion[1] | Delamination[2] | Stone chipping[3] | Corrosion[1] | Delamination[2] | Stone chipping[3] | Maximum thread length | Average thread length |
| 1 | A-B-C1-D-E | 0.6 | 0.6 | 2.2 | 4.4 | 4.4 | 3.7 | 1.6 | 0.3 |
| 2 | A-B-C2-D-E | 0.5 | 0.5 | 2.5 | 4.7 | 4.7 | 4.0 | 1.6 | 0.2 |
| 3 | A-B-C3-D-E | 0.5 | 0.5 | 2.0 | 6.1 | 6.1 | 4.0 | 1.4 | 0.3 |
| 4 | A-B-C4-D-E | 0.6 | 0.6 | 2.3 | 5.0 | 5.0 | 3.8 | 1.7 | 0.3 |
| 5 | A-B-C5-D-E | 0.8 | 0.8 | 3.7 | 4.2 | 4.2 | 4.0 | 1.1 | 0.1 |
| 6 | A-B-C1-E | 0.6 | 0.6 | 2.3 | 4.2 | 4.2 | 3.8 | 2.9 | 0.7 |
| 7 | A-B-C2-E | 0.6 | 0.6 | 2.7 | 4.1 | 4.1 | 4.0 | 1.3 | 0.3 |
| 8 | A-B-C3-E | 0.6 | 0.6 | 2.8 | 3.8 | 3.8 | 3.7 | 1.7 | 0.2 |
| 9 | A-B-C6-E | 1.1 | 2.3 | 5.0 | 4.8 | 4.8 | 4.8 | — | — |
| 10 | A-B-E | 1.0 | 1.3 | 3.0 | 4.4 | 4.4 | 4.2 | 1.4 | 0.1 |

[1] Average corrosion in mm according to DIN EN ISO 4628-8, after aging in the VW alternating climate test according to PV 1210
[2] Average delamination in mm according to DIN EN ISO 4628-8, after aging in the VW alternating climate test according to PV 1210
[3] Stone chipping test according to DIN EN ISO 20567-1, before and after aging in the VW alternating climate test according to PV 1210
[4] Thread lengths in mm according to Daimler PAPP PWT 3002, after aging in the filiform corrosion test according to DIN EN 3665

The invention claimed is:

1. A multi-step method for anti-corrosion pretreatment of components made at least in part from metallic materials, comprising steps of:

i) initially contacting at least a portion of surfaces of the components made at least in part from metallic materials with an aqueous composition (A) containing a dissolved and/or dispersed organic polymer P, of which a weight proportion of at least 40%, based on the total proportion of said organic polymer P is made up of repeating units $R_N$ which comprise as a substituent a heterocycle containing at least one quaternary nitrogen heteroatom;

and subsequent to step i), with or without a rinsing and/or drying step therebetween;

ii) bringing at least the portion of the surfaces of the components made at least in part from metallic materials into contact with an acidic aqueous composition (B) containing one or more water-soluble compounds of the elements Zr, Ti, and/or Si.

2. The method according to claim 1, wherein the repeating units $R_N$ of the polymer P, which have the heterocycle containing at least one quaternary nitrogen heteroatom, have a structural element which corresponds to the following structural formula (I):

x and y are each natural numbers independently ranging from 1 to 4;

n is a natural number ranging from 0 to 4; and $R^4$ is selected from hydrogen, and branched or unbranched aliphatic functional groups having no more than 6 carbon atoms;

where Y is a ring-constituting divalent functional group having no more than 5 bridge atoms, and no more than one hetero bridge atom that is different from carbon atoms may be selected from an oxygen, nitrogen, or sulfur bridge atom, and the carbon atoms in turn are present substituted independently of one another with functional groups $R^1$ or those functional groups via which annulation of aromatic homocyclen having no more than 6 carbon atoms is achieved.

3. The method according to claim 1, wherein the repeating units $R_N$ of the polymer P correspond to the following structural formula (II):

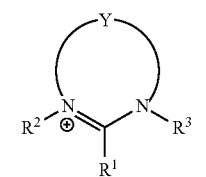

(II)

where $R^1$ is selected from hydrogen; branched or unbranched aliphatic functional groups having no more than 6 carbon atoms; and a functional group —$(CR^4R^4)_x$—$[Z(R^4)_{(p-1)}$—$(CR^4R^4)_y]_n$—$Z(R^4)_p$, where Z is in each case selected from oxygen or nitrogen;

p, where Z is nitrogen, has the value 2 and otherwise is 1;

x and y are each natural numbers ranging from 1 to 4;

n is a natural number ranging from 0 to 4, and $R^4$ is selected from hydrogen; and branched or unbranched aliphatics having no more than 6 carbon atoms;

where $R^2$ and $R^3$ are each independently selected from $R^1$; and a remaining fragment of the repeating unit $R_N$ via which the repeating units $R_N$ are covalently bonded to one another or to other repeating units $R_X$, provided that either $R^2$ or $R^3$ represents said remaining fragment of the repeating unit $R_N$; and where Y is a ring-constituting divalent functional group having no more than 5 bridge atoms, and no more than one hetero bridge atom that is different from carbon atoms may be selected from an oxygen, nitrogen, or sulfur bridge atom, and the carbon atoms in turn are present substituted independently of one another with functional groups $R^1$ or those functional groups via which annulation of aromatic homocyclen having no more than 6 carbon atoms is achieved.

4. The method according to claim 2, wherein the ring-constituting divalent functional group Y is selected from ethylene; ethenediyl; 1,3-propanediyl; 1,3-propenediyl; 1,4-butanediyl; 1,4-butenediyl; 1,4-butadiendiyl; —CH=N—; —CH$_2$—NH—; (N,N-dimethylene)amine; and (N-methylene-N-methylylidene)amine.

5. The method according to claim 2, wherein the ring-constituting divalent functional group Y is selected from ethenediyl, 1,4-butadiendiyl, —C=N, and (N-methylene-N-methylylidene)amine.

6. The method according to claim 1, wherein the repeating unit $R_N$ is selected from 1-methyl-3-vinylimidazolium, 1-ethyl-3-vinylimidazolium, 1-isopropyl-3-vinylimidazolium, 1-propyl-3-vinylimidazolium, 1-(n-butyl)-3-vinylimidazolium, 1-(isobutyl)-3-vinylimidazolium, 1-methoxy-3-vinylimidazolium, 1-ethoxy-3-vinylimidazolium, and 1-propoxy-3-vinylimidazolium.

7. The method according to claim 1, wherein the polymer P contains at least one further repeating unit $R_X$ selected from vinylpyrrolidone, vinylcaprolactam, vinyl acetate, vinylimidazole, (meth)acrylic acid amide, (meth)acrylic acid, (meth)acrylic acid esters, and/or styrene.

8. The method according to claim 7, wherein the polymer P contains at least one further repeating unit $R_X$ selected from vinylpyrrolidone, vinylimidazole and/or (meth)acrylic acid amide.

9. The method according to claim 1, wherein the repeating units $R_N$ are present in a weight fraction of at least 80%, based on an overall fraction of the polymer P.

10. The method according to claim 1, wherein the polymer P is present in composition (A) in a proportion of at least 0.05 g/kg but not more than 2 g/kg.

11. The method according to claim 8, wherein the repeating unit $R_N$ is selected from an alkyl or alkoxy substituted 3-vinylimidazolium.

12. The method according to claim 11, wherein the repeating units $R_N$ are present in a weight fraction of at least 60%, based on an overall fraction of the polymer P.

13. The method according to claim 12, wherein the polymer P is present in composition (A) in a proportion of at least 0.1 g/kg but not more than 2 g/kg.

14. The method according to claim 1, wherein no conversion layer is created on the surfaces of the metallic components in step i).

15. The method according to claim 1, wherein the aqueous composition (A) contains less than 0.005 g/kg, in each case of water-soluble compounds of the elements Zr, Ti, and/or Si, based on the particular element; and composition (B) in step ii) contains a source of fluoride ions.

16. The method according to claim 1, wherein composition (B) in step ii) additionally contains water-soluble compounds that represent a source of copper ions.

17. The method according to claim 1, wherein no rinsing step takes place between steps i) and ii).

18. The method according to claim 1, wherein the surfaces of the components made at least in part from metallic materials are at least in part iron and/or steel surfaces.

19. The method according to claim 18, wherein in addition to iron and/or steel surfaces, the component also has surfaces of zinc and/or galvanized steel and/or surfaces of aluminum.

20. The method according to claim 19, wherein the surfaces of zinc and/or galvanized steel are present in the components and have an iron coverage of at least 20 mg/m$^2$.

* * * * *